(12) United States Patent
Holden

(10) Patent No.: US 9,942,289 B2
(45) Date of Patent: *Apr. 10, 2018

(54) SMOOTHING PEAK SYSTEM LOAD VIA BEHAVIOR PREDICTION IN COLLABORATIVE SYSTEMS WITH TEMPORAL DATA ACCESS PATTERNS

(71) Applicant: International Business Machines Corporation, Armonk, NY (US)

(72) Inventor: Russell L. Holden, Boxborough, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,600

(22) Filed: Jan. 8, 2016

(65) Prior Publication Data

US 2016/0127431 A1    May 5, 2016

Related U.S. Application Data

(60) Continuation of application No. 14/705,146, filed on May 6, 2015, now Pat. No. 9,300,753, which is a
(Continued)

(51) Int. Cl.
*G06F 15/16* (2006.01)
*H04L 29/06* (2006.01)
(Continued)

(52) U.S. Cl.
CPC .......... *H04L 65/403* (2013.01); *G06F 9/5083* (2013.01); *H04L 47/823* (2013.01);
(Continued)

(58) Field of Classification Search
CPC .............................. H04L 65/403; G04F 9/5083
(Continued)

(56) References Cited

U.S. PATENT DOCUMENTS 5,305,389 A    4/1994  Palmer
6,742,033 B1 *  5/2004  Smith ............... G06F 17/30902
                                                        707/E17.12
(Continued)

FOREIGN PATENT DOCUMENTS

JP         2002342151 A2    11/2002

OTHER PUBLICATIONS

Byna, Surendra, "Server-based data push architecture for data access performance optimization," Illinois Institute of Technology (2006), retrieved from <http://www.cs.iit.edu/-suren/Abstract.pdf>, 2 pages.

(Continued)

*Primary Examiner* — Dustin Nguyen
*Assistant Examiner* — Joel Mesa
(74) *Attorney, Agent, or Firm* — Patterson + Sheridan, LLP

(57) ABSTRACT

Techniques are described above for smoothing peak load in collaborative systems. One embodiment includes, prior to a predicted peak load period, pre-staging user-data associated with one or more users of the collaborative system. During the predicted peak load period, a request from a first one of the users for access to the pre-staged user-data associated with the first user is received. And in response to the request, the pre-staged user-data is provided to the first user.

20 Claims, 5 Drawing Sheets

Related U.S. Application Data division of application No. 12/826,417, filed on Jun. 29, 2010, now Pat. No. 9,075,665.

(51) Int. Cl.
*G06F 9/50* (2006.01)
*H04L 29/08* (2006.01)
*H04L 12/911* (2013.01)
*H04L 12/58* (2006.01)

(52) U.S. Cl.
CPC .............. *H04L 51/22* (2013.01); *H04L 67/10* (2013.01); *H04L 67/2842* (2013.01); *H04L 67/2847* (2013.01); *H04L 67/322* (2013.01)

(58) Field of Classification Search
USPC .................................................. 709/206, 204
See application file for complete search history.

(56) References Cited

U.S. PATENT DOCUMENTS

| | | | |
|---|---|---|---|
| 7,237,028 B2 | 6/2007 | Pfeffer et al. | |
| 7,379,966 B2 | 5/2008 | Agnoli et al. | |
| 7,596,591 B2 | 9/2009 | Titmuss | |
| 9,075,665 B2 | 7/2015 | Holden | |
| 2003/0135565 A1* | 7/2003 | Estrada | G06Q 10/10 709/206 |
| 2005/0060498 A1* | 3/2005 | Curtis | G06F 12/0862 711/134 |
| 2005/0278642 A1 | 12/2005 | Chang et al. | |
| 2006/0136590 A1 | 6/2006 | Barrett et al. | |
| 2007/0078964 A1 | 4/2007 | East et al. | |
| 2009/0182836 A1 | 7/2009 | Aviles et al. | |
| 2009/0199190 A1 | 8/2009 | Chen et al. | |
| 2009/0207731 A1 | 8/2009 | Carlson et al. | |
| 2010/0214942 A1 | 8/2010 | Du et al. | |
| 2011/0320546 A1 | 12/2011 | Holden | |
| 2015/0237160 A1 | 8/2015 | Holden | |

OTHER PUBLICATIONS

Cheng, Bin, et al., "GridCast: Improving peer sharing for P2P VoD," Association for Computing Machinery, ACM; Transactions on Multimedia Computing, Communications and Applications, vol. 4, No. 4, Article 26, Publication date: D; Oct. 2008, pp. 26:1-26:31.

* cited by examiner

SMOOTHING PEAK SYSTEM LOAD VIA BEHAVIOR PREDICTION IN COLLABORATIVE SYSTEMS WITH TEMPORAL DATA ACCESS PATTERNS

CROSS-REFERENCE TO RELATED APPLICATIONS

This application is a continuation of U.S. patent application Ser. No. 14/705,146, filed May 6, 2015, which is a divisional of U.S. patent application Ser. No. 12/826,417, filed Jun. 29, 2010. The aforementioned related patent applications are herein incorporated by reference in their entirety.

BACKGROUND

Software as a Service (SaaS) refers to an approach for providing users with access to a software application where a service provider hosts the application and makes it accessible over a network. SaaS offerings are typically subscription based, where the software is accessed from a data center (or centers) and does not reside on client computers. This approach allows users to license the ability to access and use the software without having to install or maintain it, and without having to purchase or maintain the necessary computing hardware (e.g., a group of servers).

One type of software application that can be made available as a SaaS offering is collaborative software (also referred to as groupware, workgroup support systems or simply group support systems). Examples of collaborative software applications include systems such as email, calendaring, text chat, document authoring, wiki, and bookmarking software systems. In some cases, users access the system using a dedicate client application (e.g., an email client) but these systems can be accessed using a web-based application accessed using a browser as well. As with other multi-user server systems, collaborative software systems need to respond to changing use demands of a group of users. For example, collaborative software systems frequently have to respond to non-uniform load due to variance in user activity.

SaaS systems often experience a relative utilization lull just prior to a bubble of work, as work hours (and peak usage hours) for a group of users using a given system tend to be relatively synchronized. For example, a spike of activity around a "9 AM arrival time" within an enterprise can routinely place a very high demand on a group of email or other servers. At that time, a batch of new collaborative content may have arrived since users last accessed their systems and a large population of users access the collaborative system within a relatively short period of time (e.g., as a group of employees arrive to work between 8:30-9:30 and all log on to check email messages). One approach for a provider (or an enterprise hosting their own systems) is to provide adequate server capacity to deal with short-term peaks such as the "9 AM arrival" phenomenon, but this can be financially costly and can result in a high degree of system under-utilization. Alternatively, simply providing lower quality of service or poor response time during this period is unsatisfying for users and tends to diminish the value of a SaaS solution.

SUMMARY

Embodiments of the invention relate to systems, articles of manufacture and methods for smoothing peak system load via behavior prediction in a collaborative system with temporal data access patterns. One embodiment of the invention includes, prior to a predicted peak system load period, pre-staging user-data associated with one or more users of the collaborative system. During the predicted peak system load period, a request from a first one of the users for access to the pre-staged user-data associated with the first user is received. And in response to the request, the pre-staged user-data is provided to the first user. In a particular embodiment, following a specified period subsequent to the peak system load, it is determined that the pre-staged user data associated with a second user was not accessed by the second user and the pre-staged user data is discarded.

Yet another embodiment includes recording a plurality of times at which a first user first accesses a resource relative to a predefined time criteria, averaging the plurality of times to generate an average first access time for the resource, and preemptively accessing the resource on behalf of the first user without an explicit access request from the first user. The preemptively accessing may be done on the basis of the average first access time and the use of the resource being below a predetermined threshold. This embodiment may also include caching data based on the preemptive access, and providing the first user with access to the cached data.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
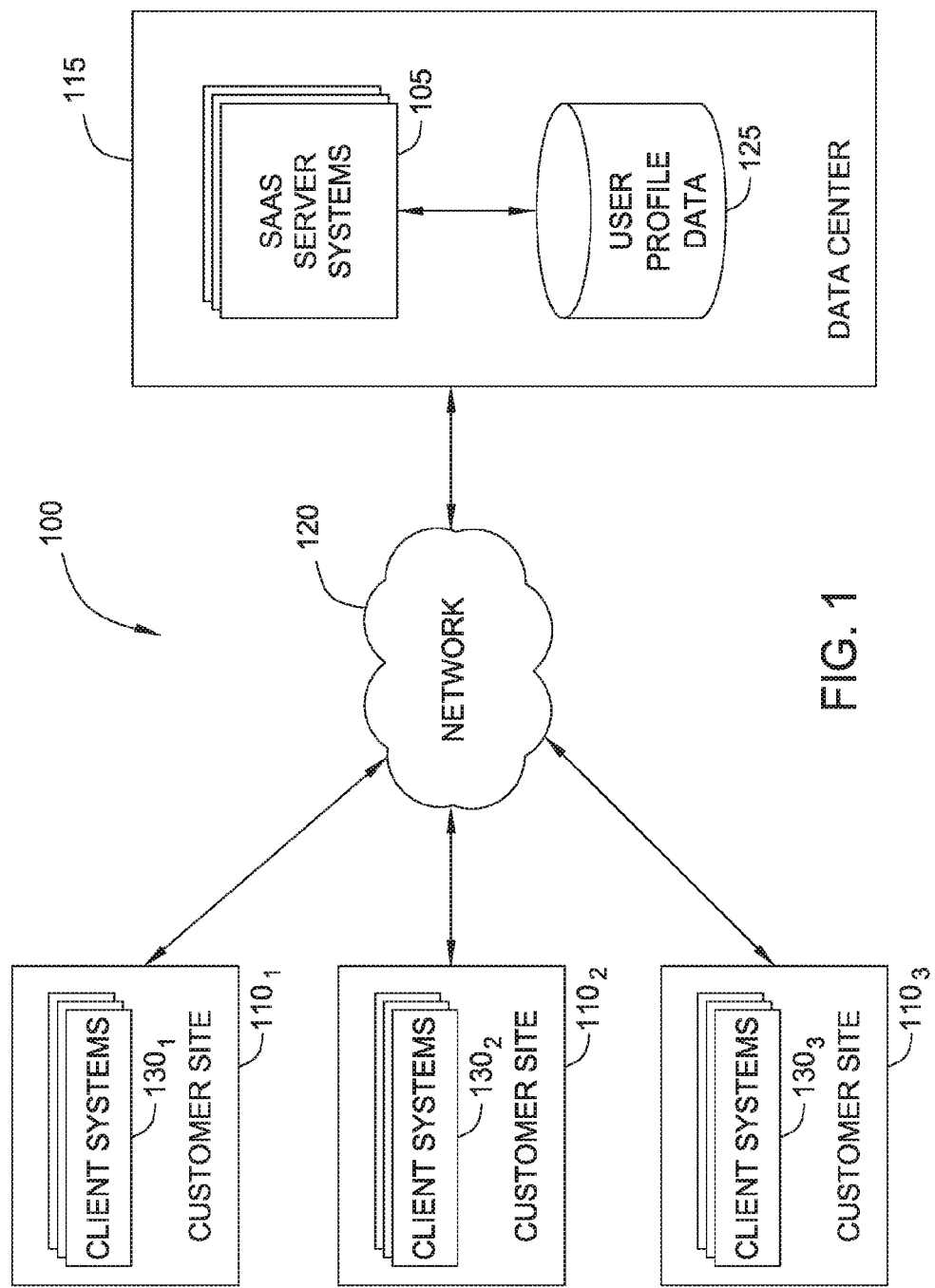
FIG. 1 illustrates a computing infrastructure configured for providing a collaborative software application as a Software as a service (SaaS) offering, according to one embodiment of the invention.

Embodiments of the invention may be used to smooth peak system load in collaborative systems. As described in greater detail below, combinations of a priori knowledge and predictive behavior may be used to trigger preparatory actions in a Software as a Service (SaaS) offering in order to reduce spikes in system load (e.g., to reduce the impact of the "9 AM arrival" problem). In a particular embodiment, the invention may include two logical components; specifically, a load prediction component and a load dampening component. The load prediction component may be configured to predict end-user access patterns including, e.g., a usual working day "start" time for individual users. Once the end-user access peaks have been identified, the load dampening component may be configured to perform whatever pre-work can be done to minimize the peaks by staging or performing preparatory actions in advance of users predicted arrival times (and system access). For example, for an email system, the load dampening component could begin accessing a database of mail files for a group of users and pre-stage new messages in memory prior to the expected arrival times of individual users in the group. Doing so could help better distribute the input/output (I/O) demands on a SaaS server, allowing a greater ratio of users per server, which, in turn, reduces reducing the number of servers required to provide the SaaS offering.

Embodiments of the invention may be extended to any number of system behaviors which are typically triggered only by end-user access (and thus susceptible to peaks in user demands for access to the system). For example, operations such as index updates, content decryption and decompression may benefit from the load dampening approaches described herein. Predictive mechanisms can also be applied to respond to a variety of patterns of user activity. Returning to the email example, if the SaaS system allows users to specify an "out-of-office indicator," the load dampening component may be configured to suspend any pre-staging operations for users who have marked themselves as being away.

In one embodiment, any pre-reading, pre-staging or pre-work is performed in a load-sensitive manner. That is, if current users are creating a high access demand for a given server, then pre-staging work is not performed. For example, a mail server could have a utilization setting that limits pre-staging to occur only when system utilization falls below the configured utilization setting.

Note, while embodiments of the invention may be adapted to a broad variety of SaaS systems where users have temporally focused access patterns (such as e-mail, RSS feeds, collaborative document systems, and workflow systems), embodiments of the invention are particularly well suited to SaaS systems where achieving high (but not overloaded) system utilization is desirable, i.e., to maximize a user to server ratio without diminishing service quality. Further, an example of a SaaS system configured to provide a collaborative service (e.g., email calendaring, contacts, etc.) is used to illustrate an example embodiment of the invention. Of course, one of skill in the art will recognize that this provides just one example of a SaaS service that embodiments of the invention may be adapted for use with a variety of application programs provided by a SaaS offering.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) "in the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an email service) or related data available in the cloud.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a computing infrastructure configured for providing a collaborative software application as a Software as a service (SaaS) offering, according to one embodiment of the invention. As shown, the computing infrastructure 100 includes a data center 115 and also includes customer sites $110_{1-3}$ connected to a communications network 120.

Data center 115 hosts a plurality of Software as a Service (SaaS) server systems 105. Each of the server systems 105 may be configured to allow users at customer sites $110_{1-3}$ to access the application provided by the SaaS servers systems 105. For example, the customer sites $110_{1-3}$ each include a plurality of client systems $130_{1-3}$ which could allow users to access a collaborative software application such as an email and workgroup application hosted by the SaaS server systems 105.

The data center 115 also includes a user profile database 125. As described in greater detail below, the user profile database 125 may be used by the SaaS servers 105 to selectively pre-stage user data to smooth a predicted use peak. For example, in one embodiment, the SaaS servers 105 may be configured to monitor the access of each of the individual client systems $130_{1-3}$ to determine user access patterns, identify temporal peak usage periods and schedule pre-staging activity to smooth out the identified peak usage periods.

Figure 2:
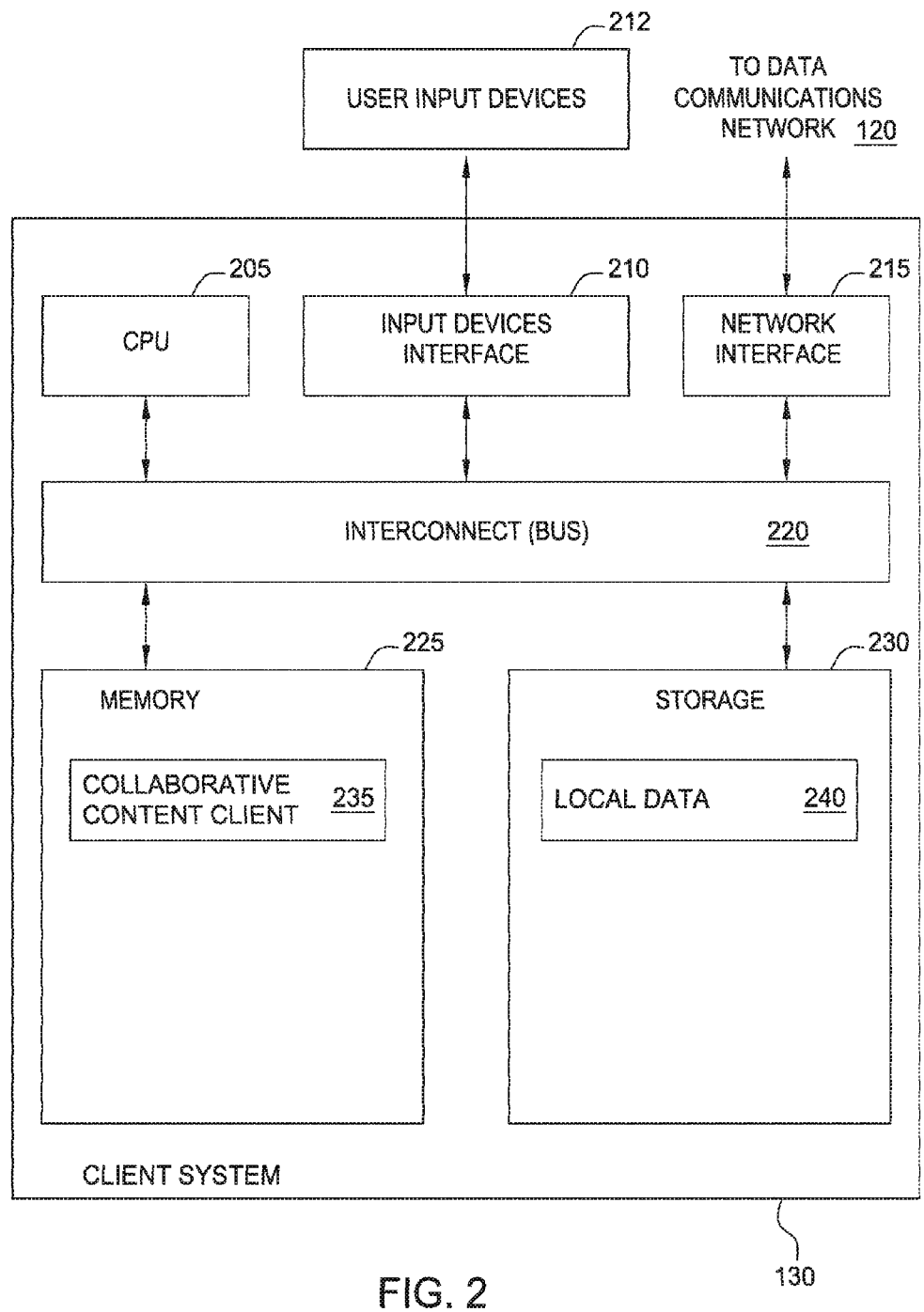
FIG. 2 is a more detailed view of the client computing system of FIG. 1, according to one embodiment of the invention.

FIG. 2 is a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 includes a collaborative client application 235 and storage 230 includes local data 240. As noted above, the collaborative client application 235 represents an example of a software application which allows a user to create and access collaborative content (or other computing resources) shared among a group of users. Again, one well-known example of the collaborative client application 235 includes an email client that allows users to send and receive email messages, accessed from an SaaS provider. In such a case, the collaborative client application 235 would be configured to connect to the SaaS server 105, prompt for user credentials (e.g., a username and password) and allow a user to retrieve and send messages (stored on client system 130 as local data 240). Further, the collaborative client application 235 may also include an interface allowing an administrator to add/remove users from the set of users authorized to access the SaaS offering. As users access their email accounts, the SaaS servers 105 may be configured to monitor the initial access time each day (or monitor other attributes of user access patterns) in order to identify peaks in user demand as well as identify patterns of behavior for particular users.

Figure 3:
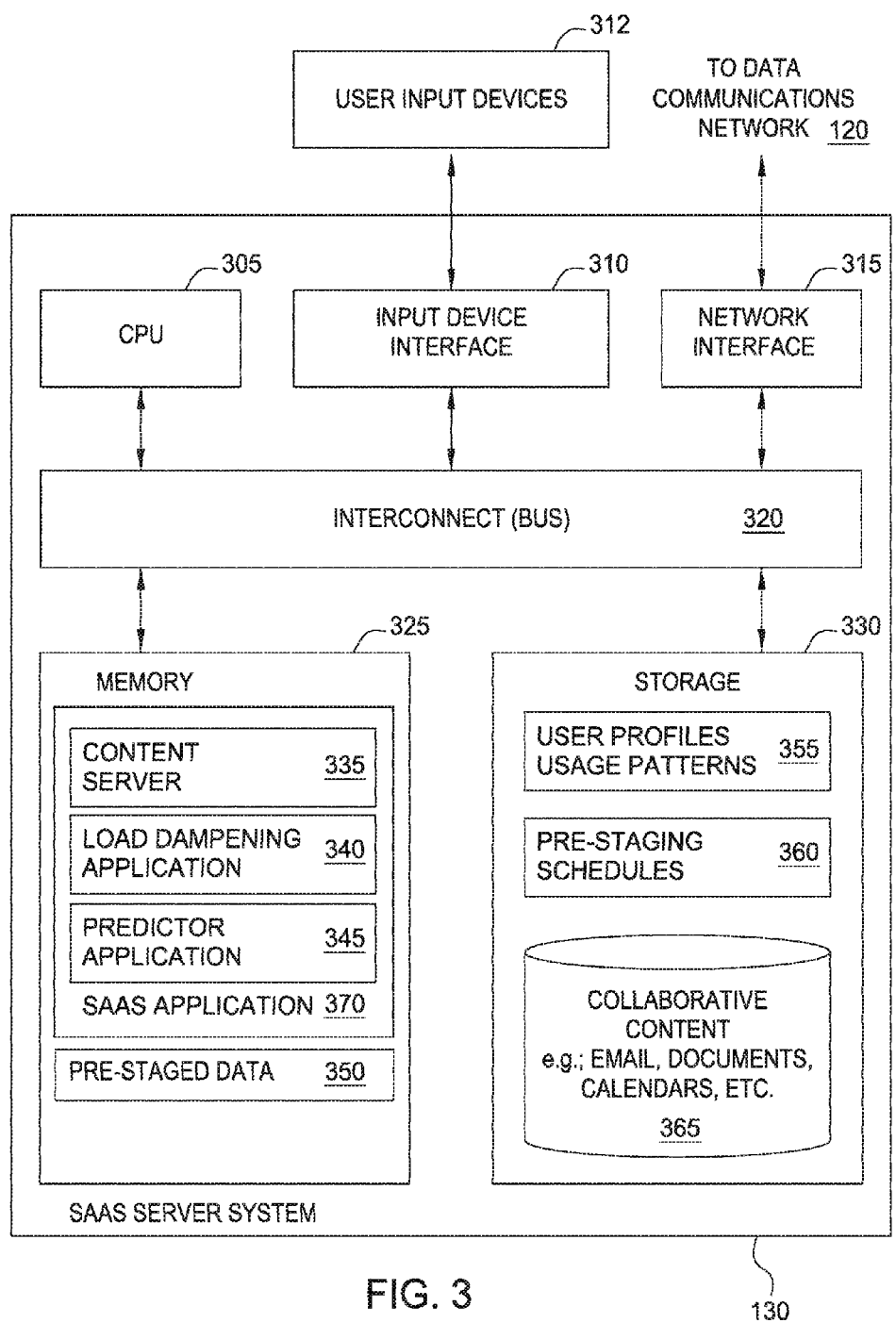
FIG. 3 is a more detailed view of the server computing system of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, floppy disc drives, tape drives, removable memory cards, optical drives, network attached storage (NAS), or a storage area-network (SAN).

As shown, the memory 325 stores a set of pre-staged data 350 and a SaaS application 370, which itself includes a content server 335, a load dampening application 340, and a predictor application 345. The storage 330 includes a set of user profiles/usage patterns 355, pre-staging schedules 360, and collaborative content database 365. The content server 335 is generally configured to respond to requests from clients, such as requests form the collaborative content client 235 running on client systems 130. Continuing with the example SaaS offering providing an email services, the content server 335 may be configured to respond to requests from client application 235 to access and send message for a given user. To respond to an user's request for access to their messages, the content server 335 may need to perform a series of I/O operations with the collaborative content database 365, which itself may involve performing a number of read operations from the storage 330. Accordingly, the throughput of these I/O operations limits the number of users that the SaaS server system 130 can concurrently support. By reducing the peaks in demand, a given SaaS server system 130 can generally increase the maximum number of users, thereby reducing the number of SaaS server systems 105 needed for an SaaS offering.

In one embodiment, the predictor application 345 may be configured to monitor user access patterns to identify peaks and schedule pre-staging operations for different users to smooth peaks in demand. In the context of an SaaS email service, e.g., the predictor application 345 may be configured to record and average an "arrival time" for individual users each day. In this example, an "arrival time" for a given user could be defined as the time of day a user first accesses the SaaS application 370 on the SaaS server system 105. After a specified period, (e.g., 14 days) the predictor application 345 could identify peaks in usage patterns from the arrival times of multiple users. Of course, one of ordinary skill in the art will recognize that this example is included to illustrate an embodiment of the invention and that a variety of approaches may be used to monitor user access patterns.

Continuing with this example, the last 14 days of arrival time may be averaged for each user—resulting in an expected arrival time for each one. The resulting data structure is stored in storage 330 as user profile/usage patterns 335. Once sorted, the predictor application 345 may generate a pre-staging schedule 360. In one embodiment, the pre-staging schedule 360 specifies a time, prior to a predicted peak, where the SaaS application 370 begins performing whatever staging operations to prepare for an expected access request for a given user. Continuing with the example SaaS offering providing an email services, the SaaS application 370, may load new messages at the end of a user's mail file by reading from the collaborative content database 365, and storing the data in the memory 375 (as pre-staged data 350). However, rather than wait for the user's access request, the load-dampening application 340 may begin staging the user's data in memory 330 in advance of an expected peak (e.g., in advance of the 9:00 AM arrival time peak). Doing so moves the I/O operations required to access the collaborative content database 365 outside of the predicted peak access period, which, in turn, allows the SaaS server system 130 to support more users concurrently.

More generally, the load dampening application 340 may be configured to perform the pre-work for users based on the pre-staging schedules 360. In one embodiment, the load-dampening application 340 may execute when system resources are below a specified utilization threshold (e.g., a disk utilization below 75%). During such periods, the load dampening application 340 performs pre-work for a given user based on the pre-staging schedules 360 at a point prior to the expected arrival of that user. Thus, for an I/O bandwidth-limited e-mail system, the load dampening application 340 pre-reads and caches recently-arrived e-mails for end-users, e.g., 30 minutes prior to their expected arrival. That is, the load-dampening application may preemptively access a computing resource (e.g. the email messages) on behalf of the user without an explicit access request from the user.

Similar techniques can be used for other personal collaborative content 365 which can be expected to be accessed (e.g, shared collaborative documents, overnight or daily reports or batch work, etc.). The pre-staged data 350 may be discarded when it is "consumed" based on end-user access or after a specified period following the expected arrival of the user (e.g., 30 minutes). Additionally, the size of pre-staged data 350 may be limited as necessary based on available system resources (e.g. the size of memory 330). Note, pre-staged data 350 is shown separately for clarity and, the pre-staged need not be stored separately by the load dampening application 340. For example, a mail and calendaring application may have a database buffer pool which can be used to pre-stage data. Further, the load dampening application could also utilize the operating system file cache when reading from the collaborative content database 365. Advantageously, using the already existing caches is that decisions about when to reclaim that memory are already being made within the systems SaaS application and the operating system.

Figure 4:
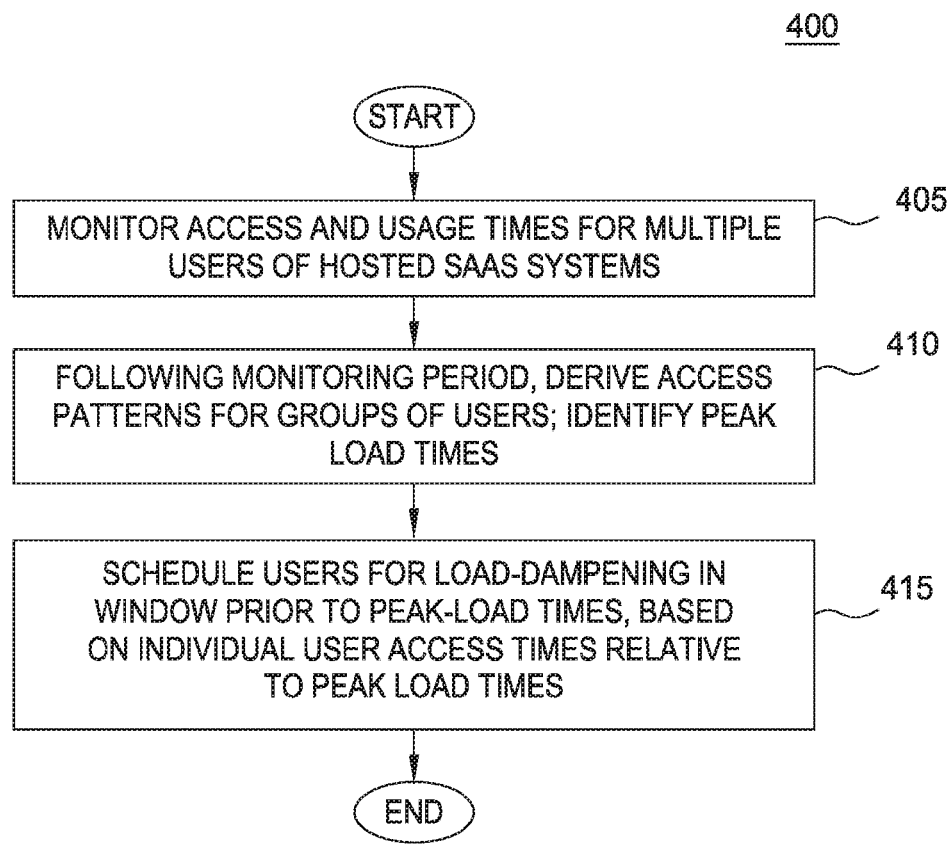
FIG. 4 illustrates a method for determining a temporal access pattern for a plurality of users of a Software as a Service (SaaS) offering, according to one embodiment of the invention.

FIG. 4 illustrates a method 400 for determining a temporal access pattern for a plurality of users of a Software as a Service (SaaS) offering, according to one embodiment of the invention. As shown, the method begins at step 405, where the access and usage times for multiple users of a hosted SaaS service offering are monitored. For example, as described above, the predictor application 345 may monitor an initial daily access time for a group of users accessing email messages stored by the hosted SaaS service.

At step 410, following a monitoring period (e.g. following a specified number of days) the access patterns for groups of users may be determined and peak load times identified. For example, the average daily arrival time (meaning the first time each day a user accesses their email messages) may be determined for each of multiple users. Together, a group of users arriving within a relatively short window result in a peak access period. At step 415, the SaaS application may smooth such an "arrival time" peak by scheduling users for load-dampening in a window prior to the "arrival time" peak. The scheduled load-dampening time for a given user may be based on the individual user access times of that user, relative to the "arrival time" peak.

Figure 5:
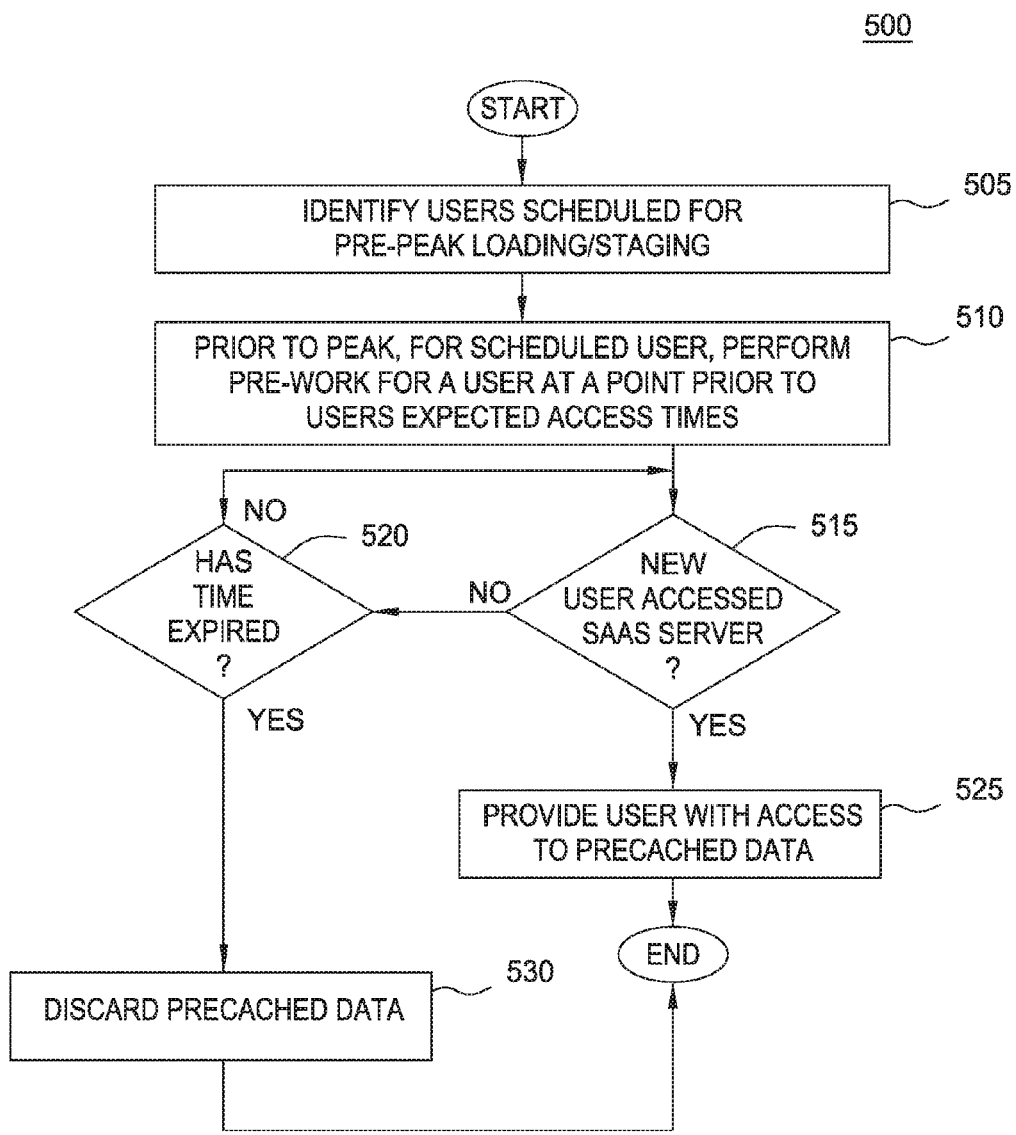
FIG. 5 illustrates a method for smoothing peak system load via behavior prediction in a collaborative system, according to one embodiment of the invention.

Once the load-dampening for a group of users is scheduled, a load dampening component or the SaaS application may perform a variety of pre-staging activity ahead of a predicted peak time. FIG. 5 illustrates a method 500 for smoothing peak system load via behavior prediction in a collaborative system, according to one embodiment of the invention. As shown, the method 500 begins at step 505, where the SaaS application identifies a group of users scheduled for pre-peak loading or staging. At step 510, prior to a predicted peak, the SaaS application may perform the appropriate staging or preparatory activity to prepare for an expected arrival of the users scheduled for pre-staging. For example, as described above, the SaaS application may begin retrieving unread email messages from a disk-based database and store them in memory. Doing so moves the I/O operations associated with accessing the disk based database out of the high-utilization peak period and into a low-utilization pre-peak staging period.

Once the preparatory work for a group of users is complete, the SaaS application waits for users to begin accessing the system (e.g., during the "9 AM arrival time" peak). At step 515, if a user has accessed the SaaS application, then at step 525, that user is provided with access data cached for that user (e.g., unread email messages from the disk-based database cached in memory of an SaaS application server). Otherwise, at step 520, if a time-period associated with the pre-staged data has elapsed, then the pre-staged data is discarded. This would result if a given user does not request access, e.g., during the "9 AM arrival time" peak.

Advantageously, embodiments described above may be used to smooth peak system load in collaborative systems. Combinations of a priori knowledge and predictive behavior may be used to trigger preparatory actions in an SaaS offering in order to reduce spikes in system load (e.g., to reduce the impact of the "9 AM arrival" problem). The SaaS offering includes two logical components; specifically, a load prediction component and a load dampening component. The load prediction component may be configured to predict end-user access patterns including, e.g., a usual working day "start" time for individual users. Once the end-user access peaks have been identified, the load dampening component may be configured to perform whatever pre-work can be done to minimize the peaks by staging or performing preparatory actions in advance of users predicted arrival times (and system access).

While the foregoing is directed to embodiments of the present invention, other and further embodiments of the invention may be devised without departing from the basic scope thereof, and the scope thereof is determined by the claims that follow.

What is claimed is:

1. A computer-implemented method of smoothing system loads in a collaborative system, the method comprising:
recording a plurality of times at which a first user first accesses a resource relative to a predefined time criteria;
determining, based on the recorded times, an average first access time for the resource;
accessing, based on the determined average first access time and a use of the resource being less than a predetermined threshold, the resource on behalf of the first user without an explicit access request from the first user;
caching first data based on the access; and
providing the first user with access to the cached first data.

2. The method of claim 1, wherein the resource is an email client, and the first data comprises one or more email messages.

3. The method of claim 1, further comprising:
accessing the resource on behalf of a second user without an explicit access request from the second user;
caching second data based on the access on behalf of the second user;
determining an amount of time that has elapsed following the caching of the second data; and
determining, based on the determined amount of time and whether the second user has accessed the cached second data during the amount of time, whether to discard the cached second data.

4. The method of claim 1, wherein the first data comprises one or more documents composed by users of the collaborative system.

5. The method of claim 1, wherein caching the first data comprises retrieving the first data from a disk-based storage system and caching the retrieved first data in a memory.

6. The method of claim 1, further comprising discarding the first data after the first user has accessed the cached first data.

7. The method of claim 1, further comprising:
determining, for each of a plurality of users of the collaborative system including the first user, a respective average first access time;
generating, based on the determined plurality of average first access times, a schedule of accesses for each of the plurality of users; and
performing the accesses on behalf of the first user according to the generated schedule.

8. The method of claim 7, further comprising:
predicting a peak load period based on the determined plurality of average first access times,
wherein generating the schedule of accesses is based on the predicted peak load period.

9. A computer program product for smoothing system loads in a collaborative system, the computer program product comprising:
a computer-readable device having computer-readable program code embodied therewith, the computer-readable program code executable by one or more computer processors to:
record a plurality of times at which a first user first accesses a resource relative to a predefined time criteria;
determine, based on the recorded times, an average first access time for the resource;
access, based on the determined average first access time and a use of the resource being less than a predetermined threshold, the resource on behalf of the first user without an explicit access request from the first user;
cache first data based on the access; and
provide the first user with access to the cached first data.

10. The computer program product of claim 9, wherein the resource is an email client, and the first data comprises one or more email messages.

11. The computer program product of claim 9, wherein the first data comprises one or more documents composed by users of the collaborative system.

12. The computer program product of claim 9, wherein caching first data comprises retrieving the first data from a disk-based storage system and caching the retrieved first data in a memory.

13. The computer program product of claim 9, wherein the computer-readable program code is further executable to discard the first data after the first user has accessed the cached first data.

14. The computer program product of claim 9, wherein the computer-readable program code is further executable to:
determine, for each of a plurality of users of the collaborative system including the first user, a respective average first access time;
generate, based on the determined plurality of average first access times, a schedule of accesses for each of the plurality of users; and
perform the accesses on behalf of the first user according to the generated schedule.

15. The computer program product of claim 14, wherein the computer-readable program code is further executable to:
predict a peak load period based on the determined plurality of average first access times,
wherein generating the schedule of accesses is based on the predicted peak load period.

16. A system to smooth system loads in a collaborative system, the system comprising:
one or more computer processors;
a memory containing a program which, when executed by the one or more computer processors, performs an operation comprising:
recording a plurality of times at which a first user first accesses a resource relative to a predefined time criteria;
determining, based on the recorded times, an average first access time for the resource;
accessing, based on the determined average first access time and a use of the resource being less than a predetermined threshold, the resource on behalf of the first user without an explicit access request from the first user;
caching first data based on the access; and
providing the first user with access to the cached first data.

17. The system of claim 16, wherein the first data comprises one of:
one or more email messages, and
one or more documents composed by users of the collaborative system.

18. The system of claim 16, the operation further comprising discarding the first data after the first user has accessed the cached first data.

19. The system of claim 16, the operation further comprising:
determining, for each of a plurality of users of the collaborative system including the first user, a respective average first access time;
generating, based on the determined plurality of average first access times, a schedule of accesses for each of the plurality of users; and
performing the accesses on behalf of the first user and on behalf of the second user according to the generated schedule.

20. The system of claim 19, the operation further comprising:
predicting a peak load period based on the determined plurality of average first access times,
wherein generating the schedule of accesses is based on the predicted peak load period.

* * * * *